United States Patent
Tsirkin (10) Patent No.: US 11,748,135 B2
(45) Date of Patent: Sep. 5, 2023

(54) UTILIZING VIRTUAL INPUT/OUTPUT MEMORY MANAGEMENT UNITS (IOMMU) FOR TRACKING ENCRYPTION STATUS OF MEMORY PAGES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 352 days.

(21) Appl. No.: 16/943,551

(22) Filed: Jul. 30, 2020

(65) Prior Publication Data
US 2022/0035647 A1  Feb. 3, 2022

(51) Int. Cl.
*G06F 9/455* (2018.01)
*G06F 12/06* (2006.01)
*G06F 13/28* (2006.01)
*G06F 9/445* (2018.01)
*H04L 9/08* (2006.01)

(52) U.S. Cl.
CPC .......... *G06F 9/45558* (2013.01); *G06F 9/445* (2013.01); *G06F 12/0646* (2013.01); *G06F 13/28* (2013.01); *G06F 2009/45583* (2013.01); *G06F 2212/152* (2013.01); *H04L 9/0869* (2013.01); *H04L 9/0872* (2013.01)

(58) Field of Classification Search
None
See application file for complete search history.

(56) References Cited

U.S. PATENT DOCUMENTS

| | | |
|---|---|---|
| 7,882,330 B2 | 2/2011 | Haertel et al. |
| 9,317,452 B1 | 4/2016 | Forschmiedt et al. |
| 9,679,143 B2 | 6/2017 | Desai |
| 2010/0011147 A1* | 1/2010 | Hummel ............ G06F 9/45558 718/1 |
| 2010/0023941 A1* | 1/2010 | Iwamatsu ........... G06F 9/45558 718/1 |

(Continued)

FOREIGN PATENT DOCUMENTS

EP  2652626 A1  10/2013

OTHER PUBLICATIONS

Amit et al, "vIOMMU: Efficient IOMMU Emulation", Technion & IBM Research, 14 pages https://www.cse.iitd.ac.in/~sbansal/csl862-virt/readings/vIOMMU.pdf.

(Continued)

*Primary Examiner* — Abu Zar Ghaffari
(74) *Attorney, Agent, or Firm* — Lowenstein Sandler LLP (57) ABSTRACT

Systems and methods for memory management for virtual machines. An example method may include creating, by a hypervisor running on a host computer system, a virtual device associated with a virtual machine managed by the hypervisor. The virtual device may include a virtual input/output memory management unit (IOMMU). The method may further include appending, by a driver of the virtual device, a plurality of page table entries to a page table of the virtual IOMMU, wherein each page table entry of the plurality of page table entries references unencrypted memory pages used by the virtual machine. Responsive to receiving a memory access request with respect to a memory page, the hypervisor may determine, using the page table of the virtual IOMMU, whether the memory page is encrypted.

9 Claims, 6 Drawing Sheets

(56) References Cited

U.S. PATENT DOCUMENTS

| | | | |
|---|---|---|---|
| 2012/0216188 A1* | 8/2012 | Tsirkin | G06F 9/45558 |
| | | | 718/1 |
| 2015/0178198 A1* | 6/2015 | Pratt | G06F 12/08 |
| | | | 711/6 |
| 2015/0370727 A1* | 12/2015 | Hashimoto | G06F 21/64 |
| | | | 711/163 |
| 2017/0091487 A1* | 3/2017 | Lemay | H04L 9/3234 |
| 2018/0011797 A1 | 1/2018 | Shi et al. | |
| 2018/0107608 A1* | 4/2018 | Kaplan | G06F 12/1466 |
| 2018/0232320 A1* | 8/2018 | Raval | G06F 12/1081 |
| 2018/0329829 A1* | 11/2018 | Zmudzinski | G06F 12/1027 |
| 2019/0018800 A1* | 1/2019 | Jayasena | G06F 9/4856 |
| 2019/0079896 A1* | 3/2019 | Srivastava | G06F 15/17331 |
| 2019/0095334 A1* | 3/2019 | Shanbhogue | G06F 12/1475 |
| 2019/0171379 A1* | 6/2019 | Van Riel | G06F 3/0643 |
| 2019/0179786 A1* | 6/2019 | Edirisooriya | G06F 9/45533 |
| 2020/0192825 A1* | 6/2020 | Ng | G06F 12/1009 |

OTHER PUBLICATIONS

"IOMMU Introduction", Aug. 4, 2019, 4 pages https://terenceli.github.io/%E6%8A%80%E6%9C%AF/2019/08/04/iommu-introduction.

* cited by examiner

UTILIZING VIRTUAL INPUT/OUTPUT MEMORY MANAGEMENT UNITS (IOMMU) FOR TRACKING ENCRYPTION STATUS OF MEMORY PAGES

TECHNICAL FIELD

The present disclosure is generally related to virtualized computer systems, and more particularly, to tracking the encryption status of memory pages by utilizing virtual input/output memory management units.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for tracking encryption status of memory pages by utilizing input/output memory management units (IOMMUs). Modern computer systems use trusted execution environments (TEEs) to enhance the isolation of data of a computing process from other processes executing on the computer system. A trusted execution environment may use hardware-based encryption to encrypt the data of a lower privileged process so that higher privileged computing processes would not have access to the data in an unencrypted form. This enables a lower privileged process to isolate its data from the higher privileged processes even though the higher privileged processes may be responsible for managing the data. In one example, one or more TEEs may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, other technology, or a combination thereof.

Encrypted virtual machine memory is a technology supported by TEEs, in which guest memory of the virtual machine is protected from the hypervisor by means of encryption. Typically, not all of the guest memory needs to be encrypted, so the virtual machine can control which memory is encrypted by means of marking memory as unencrypted or encrypted in guest controlled guest page tables, which can be used by a virtual central processing unit (vCPU) for translation of guest virtual addresses to guest physical addresses. The guest physical addresses may then be translated by the host to host physical addresses.

An encryption key for each memory page of the encrypted memory may be generated using, for example, a random number and the location of the memory page (e.g., a host physical address). As such, each encrypted memory page is address-dependent. To transfer the contents of the data from the encrypted memory page, the central processing unit (CPU) may decrypt the memory page using the encryption key, re-encrypt the memory page with an address-independent encryption key, transfer the data to a new host physical address, and then re-encrypt the memory page using, inter alia, the new host physical address.

When virtual machines use virtual devices, a portion of the guest memory is used by the virtual machine for communication with the virtual devices. Since the virtual devices are implemented by the hypervisor, the hypervisor may need access to the portion of guest memory for memory writing or reading operations associated with the virtual device. For example, the hypervisor may access the portion of guest memory to write, into the guest memory, data received by the virtual device (e.g., a virtual network interface controller (vNIC)), or to read, from the guest memory, data to be sent to the virtual device. Similarly, the hypervisor may need to access portions of guest memory for other virtual devices. Accordingly, this portion of guest memory needs to remain unencrypted for the hypervisor to be able to utilize it.

However, a hypervisor may not know which portions of guest memory are encrypted and which portions are unencrypted. Decrypting and re-encrypting the guest memory can corrupt the guest, because the guest memory is encrypted with an address-dependent key, and the content of the guest memory would be altered if the memory pages when decrypted and then re-encrypted with a new address specific key. Another solution may include the virtual machine maintaining a page list notifying the hypervisor which pages are unencrypted using para-virtualization, which would require modifying the guest operating system (OS). Such modifications can be undesirable. Aspects of the present disclosure address the above-noted and other deficiencies by providing systems and methods of utilizing virtual devices with input/output memory management units (IOMMU) for tracking the encryption status of memory pages. In particular, aspects of the present disclosure provide technology that allows a hypervisor to create a virtual device with an IOMMU and expose the device to a virtual machine via an appropriate driver. The virtual machine would then assume that peripheral devices need to have their memory pages referenced by the IOMMU page table in order to perform direct memory access (DMA) operations. DMA allows a peripheral device to access the system memory for reading and/or writing independently of the central processing unit (CPU). While a peripheral device is performing the DMA, the CPU can engage in other operations. Therefore, the virtual machine would thus leave unencrypted the memory pages referenced by the page table of the IOMMU.

The hypervisor may then use the IOMMU page table to determine whether guest memory is encrypted. For example, the hypervisor may receive a memory access request to a memory page and, responsive to the request, use the IOMMU page table to determine whether the requested memory page is encrypted. In particular, if the memory page has a corresponding page table entry in the IOMMU page table, the page is unencrypted; otherwise, if no page table entry referencing the address of the page is found in the IOMMU page table, the page should be assumed to be encrypted.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

Figure 1:
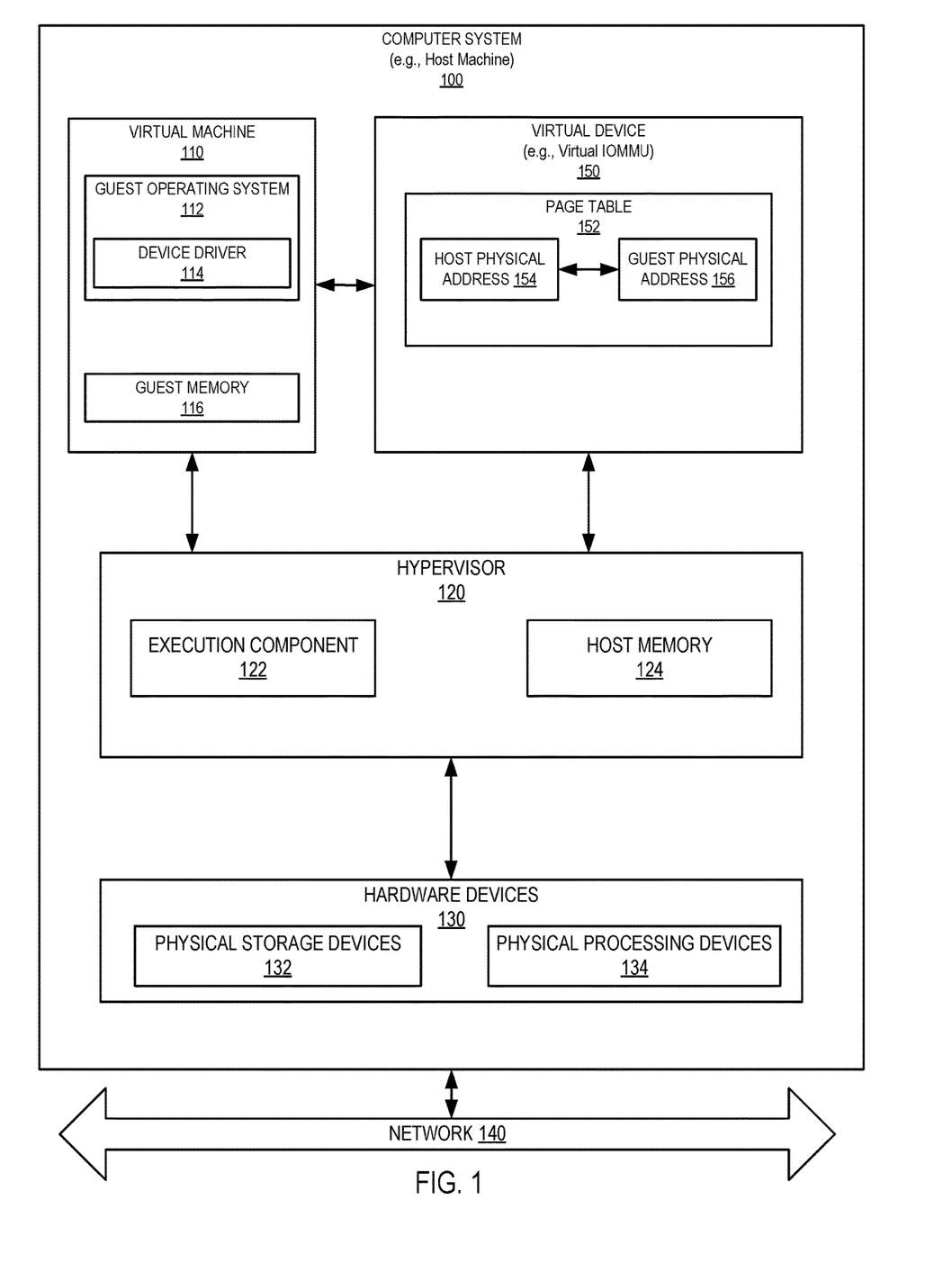
FIG. 1 depicts a high-level block diagram of an example host computer system that performs memory detection, in accordance with one or more aspects of the present disclosure.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, hardware devices 130, a network 140, and a virtual device 150.

Virtual machine 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that manages device drive 114 and guest memory 116.

Device driver 114 may be any type of virtual or physical device driver, such as, for example, a vCPU driver. In an example, device driver 114 may be utilized for creating virtual device 150. In another example, device driver 114 may be utilized for communicating with virtual device 150 and requesting hypervisor 120 to map, to a page table of virtual device 150, a plurality of records referencing memory pages used by virtual machine 110. The features provided by device driver 114 may be integrated into the operations performed by guest operating system 112. The features of device driver 114 are discussed in more detail below in regards to the computer system of FIG. 2.

Guest memory 116 may be any virtual memory, logical memory, physical memory, other portion of memory, or a combination thereof for storing, organizing, or accessing data. Guest memory 116 may represent the portion of memory that is designated by hypervisor 120 for use by virtual machine 110. Guest memory 116 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Host memory 124 (e.g., hypervisor memory) may be the same or similar to the guest memory but may be managed by hypervisor 120 instead of a guest operating system. Host memory 124 may include host pages, which may be in different states. The states may correspond to unallocated memory, memory allocated to guests, and memory allocated to hypervisor. The unallocated memory may be host memory pages that have not yet been allocated by host memory 124 or were previously allocated by hypervisor 120 and have since been deallocated (e.g., freed) by hypervisor 120. The memory allocated to guests may be a portion of host memory 124 that has been allocated by hypervisor 120 to virtual machine 110 and corresponds to guest memory 116. Other portions of hypervisor memory may be allocated for use by hypervisor 120, a host operating system, hardware device, other module, or a combination thereof.

Hypervisor 120 (also be known as a virtual machine monitor (VMM)) may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include an execution component 122.

Execution component 122 may enable hypervisor 120 to create a virtual device(s), map records referencing memory pages to a page table of the virtual device, and determine whether memory pages are encrypted. Execution component 122 will be explained in greater detail below.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing device 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

As noted herein above, hypervisor 120 may create a virtual device 150 having an IOMMU and expose the virtual device 150 to the virtual machines via an appropriate virtual device driver 114. The virtual device 150 may have no associated hardware, and the IOMMU functionality may be implemented by the hypervisor module that communicated with the virtual device driver 114. An IOMMU is a memory management unit (MMU) that resides on the input/output (I/O) path connecting a device to the memory and manages address translations. The IOMMU brokers an incoming DMA request on behalf of an I/O device by translating the virtual address referenced by the I/O device to a physical address similarly to the translation process performed by the MMU of a CPU. Accordingly, the IOMMU of the virtual device 150 may maintain a page table 152. Page table 152 may include a set of page table entries. Each page table entry may map a guest physical address 156 to a host physical address 154. Device driver 114 may indicate to virtual machine 110 that virtual device 150 has DMA (direct memory access) capabilities (e.g., performs DMA operations). Accordingly, the virtual machine 110 would invoke the device driver 114 to create, in the page table 152 maintained by the virtual device 150, page table entries for all memory pages needed by the virtual device 150 to access memory using DMA.

Figure 2:
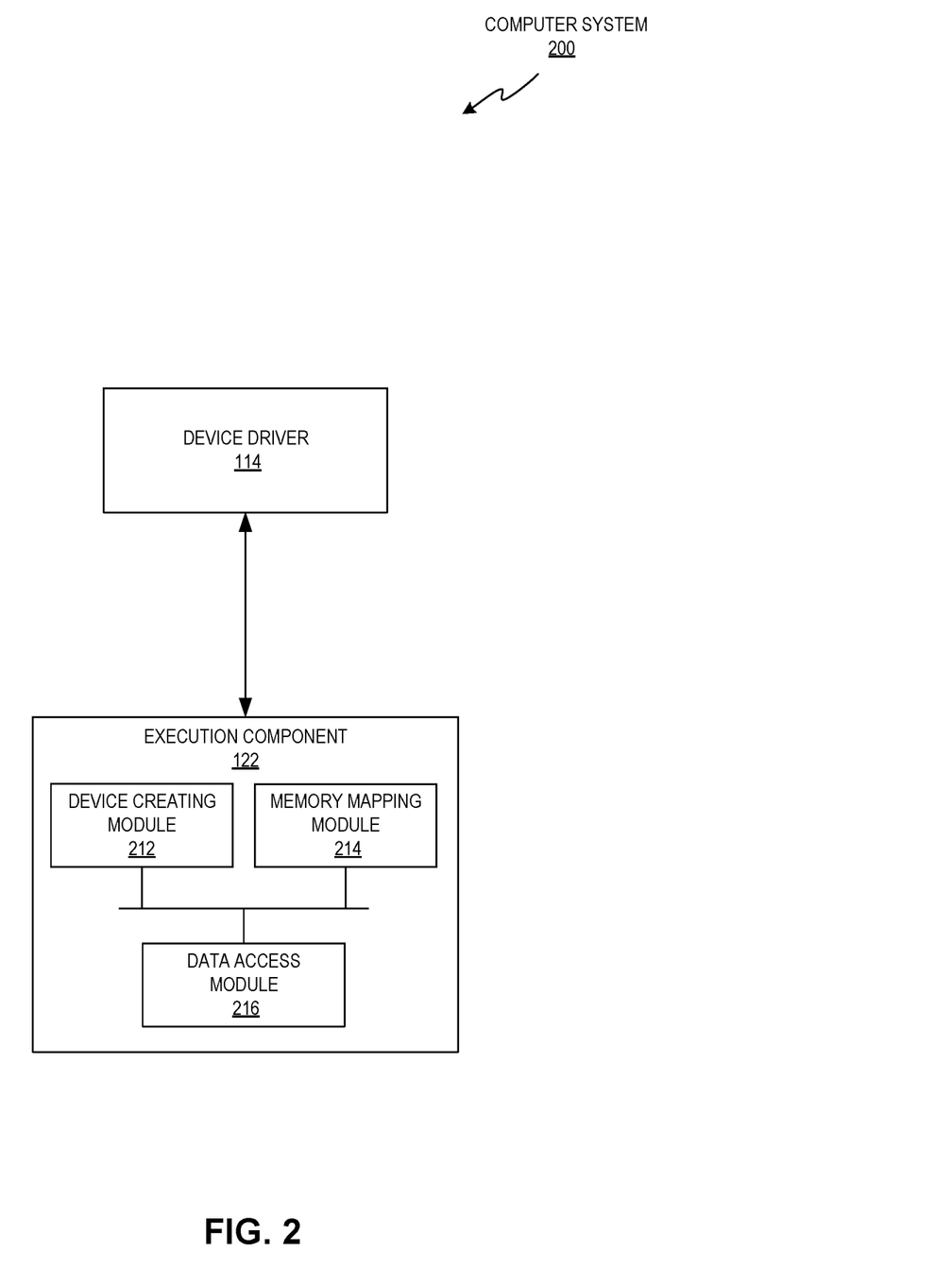
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include device driver 114 and hypervisor 122.

Execution component 122 may enable computer system 200 to create a virtual device(s), map records referencing memory pages to a page table of the virtual device, and determine whether memory pages are encrypted to enhance the performance of computer system 200. As illustrated, execution component 122 may include a device creating module 212, a memory mapping module 214, and a data access module 216.

Device creating module 212 may create a virtual device (e.g., virtual device 150) associated with a virtual machine (e.g., virtual machine 110). In an example, device creating module 212 may create virtual device 150 by instructing virtual machine 110 to load device driver 114. Device driver 114 may include executable code to generate virtual device 150. By way of example, the virtual device will be referred to, hereafter, as a virtual IOMMU. The virtual IOMMU may include a page table (e.g., page table 152). The virtual IOMMU may communicate with virtual machine 110 via device driver 114. In an example, the device driver 114 may indicate to the virtual machine 110 that the virtual IOMMU includes DMA capabilities. The virtual machine may then invoke the device driver 114 to create, in a page table maintained by the virtual device, page table entries for all memory pages needed by the virtual device 150 to access memory using DMA. Device driver 114 may then request the memory mapping module 214 to map, to the page table of the virtual IOMMU, a plurality of records referencing memory pages used by the virtual machine. The memory pages may be unencrypted memory pages. Device driver 114 may indicate to the device creating module 212 which pages are unencrypted.

Memory mapping module 214 may map records referencing memory pages to the page table of the virtual IOMMU. For example, memory mapping module 214 may map records referencing unencrypted memory pages used by the virtual machine to the page table. The hypervisor may then use the page table to determine whether memory pages used by the virtual machine (e.g., guest memory) are encrypted.

In an example, data access module 216 may receive a memory access request to a memory page. Responsive to receiving the request, the data access module 216 may use the page table of the virtual IOMMU to determine whether the requested memory page is encrypted. For example, if the requested memory page has a corresponding page table entry in the page table, this indicates that the requested memory page is unencrypted. If the requested memory page has no corresponding page table entry in the page table, this may indicate that the memory page is encrypted. By using the page table to determine whether a memory page is encrypted, the hypervisor does not need to use a para-virtual interface or a page list determine whether a memory page is encrypted. Thus, the virtual machine may remain unmodified by the hypervisor.

Figure 3:
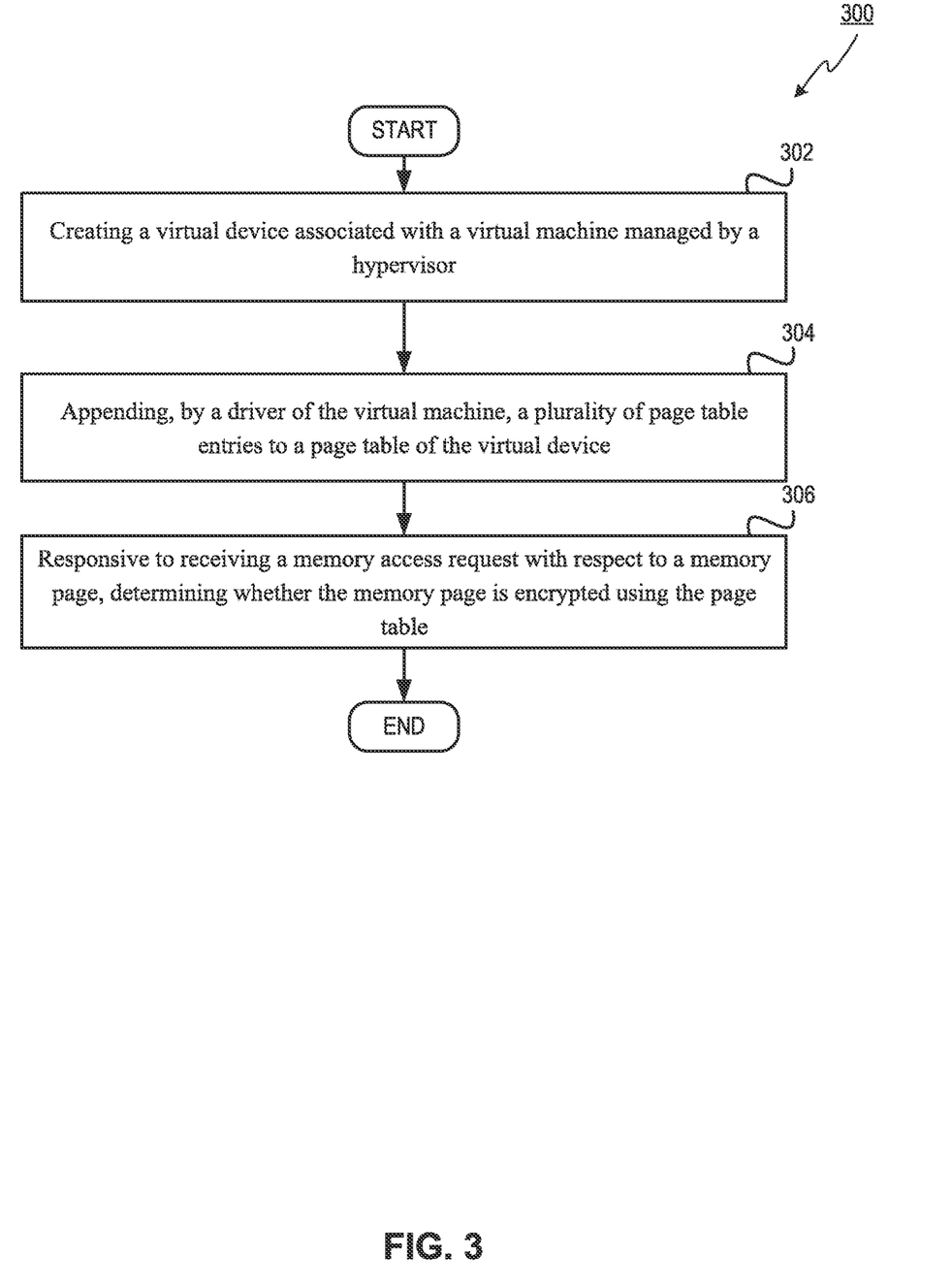
FIG. 3 depicts a flow diagram of an example method for tracking encryption status of memory pages by utilizing input/output memory management units (IOMMUs), in accordance with one or more aspects of the present disclosure.

FIG. 3 depicts a flow diagram of an illustrative example of a method 300 for virtualized memory detection, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, a hypervisor running on a host computer system may create a virtual device associated with a virtual machine managed by the hypervisor. The virtual device may include a virtual IOMMU. In an example, the virtual IOMMU may indicate to the virtual machine that the virtual IOMMU includes DMA capabilities (e.g., performs DMA operations). In another example, the virtual machine may assume that the virtual IOMMU requires page table entries for DMA capabilities. In response, the hypervisor may create the virtual IOMMU by instructing the virtual machine to load a device driver which includes executable code to generate virtual IOMMU. The virtual machine may request the hypervisor to append, to the page table of the virtual IOMMU, a plurality of records referencing memory pages used by the virtual machine.

In block 304, the hypervisor may append, by a driver of the virtual machine, page table entries to a page table of the virtual IOMMU. Each page table entry may reference unencrypted memory pages used by the virtual machine.

At block 306, responsive to receiving a memory access request with respect to a memory page, the hypervisor may determine whether the memory page is encrypted by using the page table of the virtual IOMMU. For example, if the requested memory page has a corresponding page table entry in the page table of the virtual IOMMU, this indicates that the requested memory page is unencrypted. If the requested memory page has no corresponding page table entry in the page table of the virtual IOMMU, this may indicate that the memory page is encrypted. Responsive to determining that the memory page in unencrypted, the hypervisor may read the memory page and/or write to the memory page. Responsive to completing the operations described herein above with references to block 306, the method may terminate.

Figure 4:
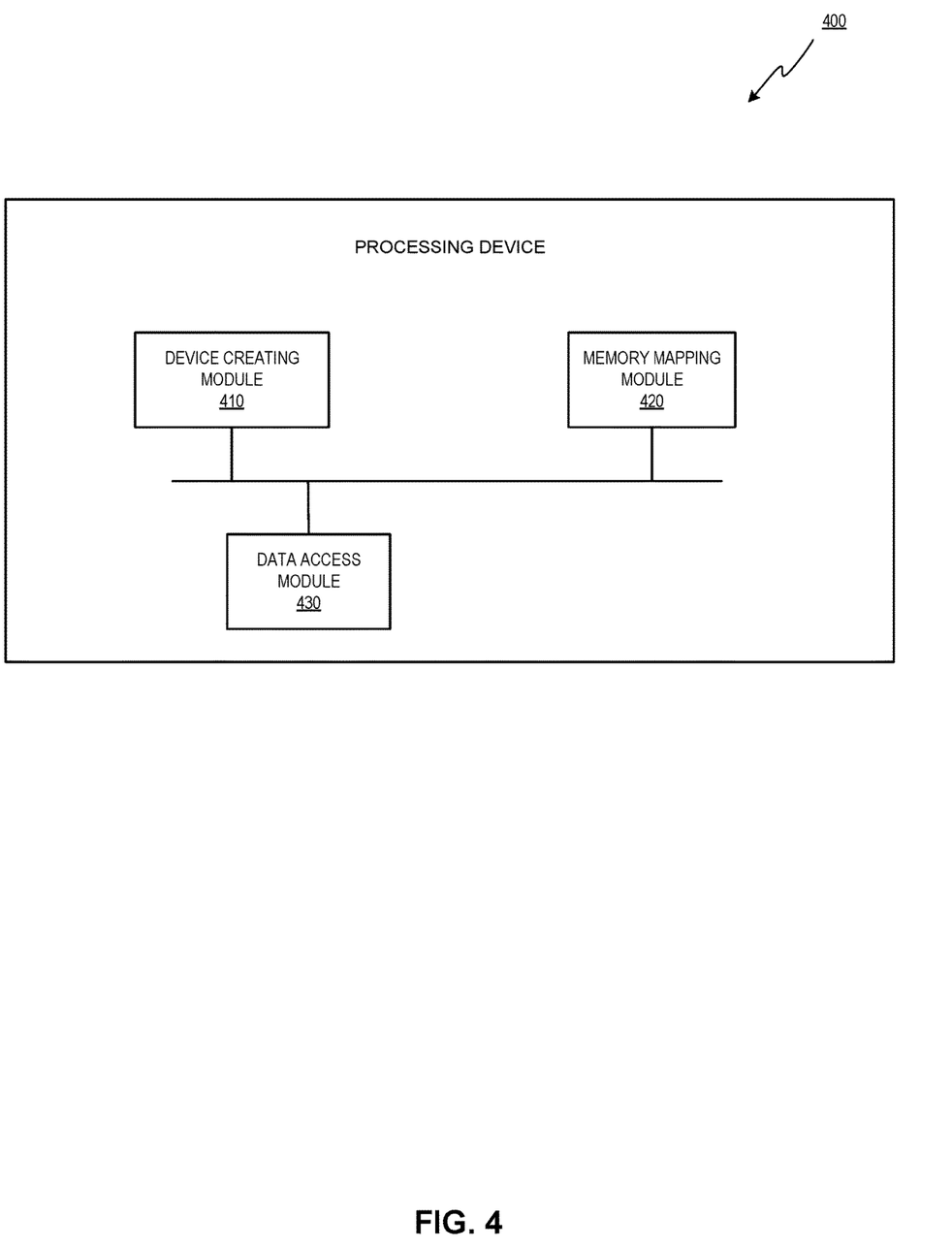
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computer system 100 and may include one or more processing devices and one or more memory devices. In the example shown, computer system 400 may include a device creating module 410, a memory mapping module 420, and a data access module 430.

Memory mapping module 410 may enable a hypervisor running on a host computer system to create a virtual device associated with a virtual machine managed by the hypervisor. The virtual device may include a virtual IOMMU. In an example, the virtual IOMMU may indicate to the virtual machine that the virtual IOMMU includes DMA capabilities. In another example, the virtual machine may assume that the virtual IOMMU requires page table entries for DMA capabilities. In response, the hypervisor may create the virtual IOMMU by instructing the virtual machine to load a device driver which includes executable code to generate virtual IOMMU. The virtual machine may request the hypervisor to append, to the page table of the virtual IOMMU, a plurality of records referencing memory pages used by the virtual machine.

Memory mapping module 420 may enable the hypervisor to append, by a driver of the virtual machine, page table entries to a page table of the virtual IOMMU. Each page table entry may reference unencrypted memory pages used by the virtual machine.

Data access module 430 may, responsive to receiving a memory access request with respect to a memory page, determine whether the memory page is encrypted by using the page table of the virtual IOMMU. For example, if the requested memory page has a corresponding page table entry in the page table of the virtual IOMMU, this indicates that the requested memory page is unencrypted. If the requested memory page has no corresponding page table entry in the page table of the virtual IOMMU, this may indicate that the memory page is encrypted. Responsive to determining that the memory page in unencrypted, the data access module 430 may read the memory page and/or write to the memory page.

Figure 5:
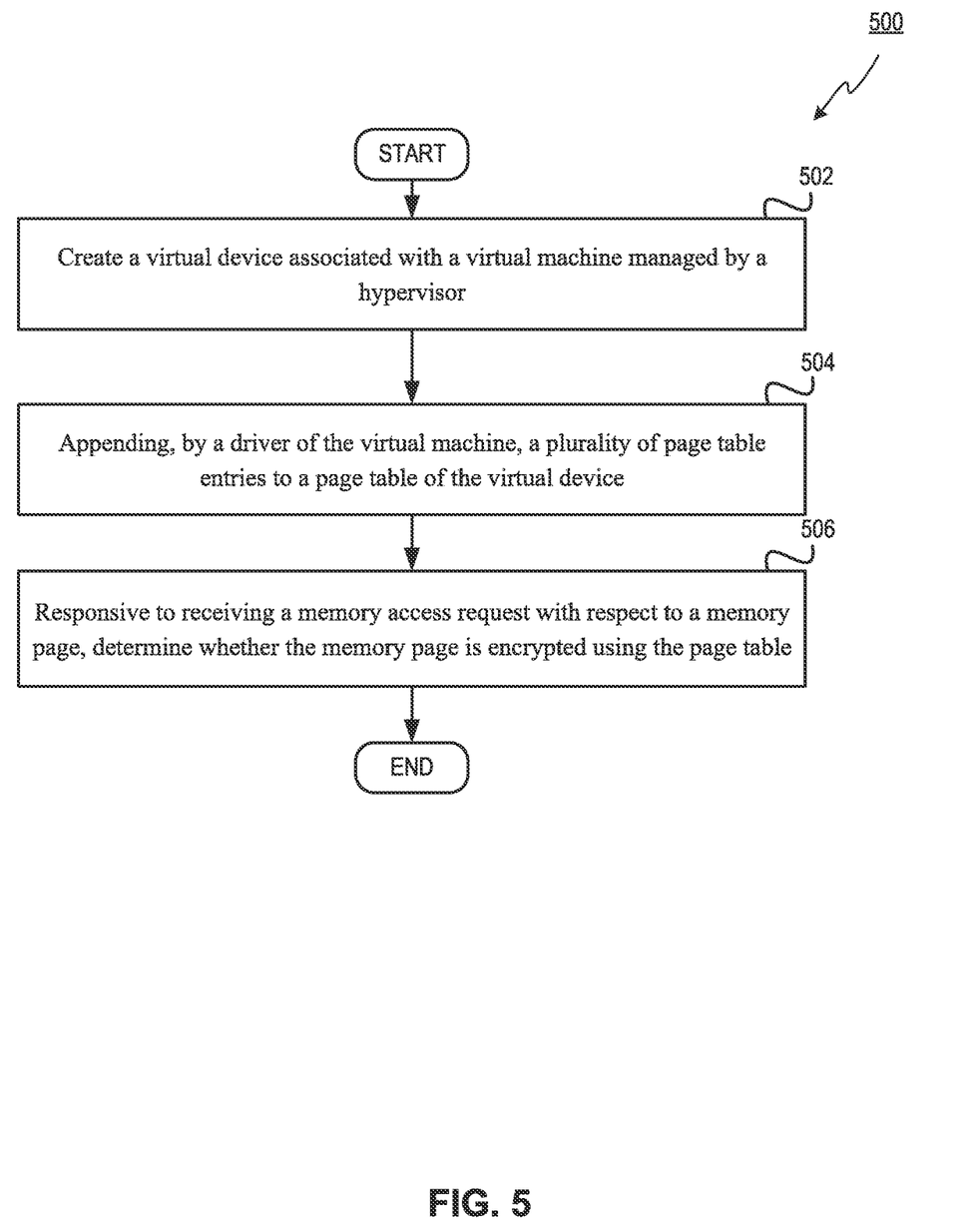
FIG. 5 depicts a flow diagram of another example method for tracking encryption status of memory pages by utilizing input/output memory management units (IOMMUs), in accordance with one or more aspects of the present disclosure.

FIG. 5 depicts a flow diagram of one illustrative example of a method 500 for virtualized memory management, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may run a hypervisor on a host computer system and create a virtual device associated with a virtual machine managed by the hypervisor. The virtual device may include a virtual IOMMU. In an example, the processing device may indicate to the virtual machine that the virtual IOMMU includes DMA capabilities. In another example, the virtual machine may assume that the virtual IOMMU requires page table entries for DMA capabilities. In response, the processing device may create the virtual IOMMU to load a device driver which includes executable code to generate virtual IOMMU. The processing device may request the hypervisor to append, to the page table of the virtual IOMMU, a plurality of records referencing memory pages used by the virtual machine.

In block 504, the processing device may append, by a driver of the virtual machine, page table entries to a page table of the virtual IOMMU. Each page table entry may reference unencrypted memory pages used by the virtual machine.

At block 506, responsive to receiving a memory access request with respect to a memory page, the processing device may determine whether the memory page is encrypted by using the page table of the virtual IOMMU. For example, if the requested memory page has a corresponding page table entry in the page table of the virtual IOMMU, this indicates that the requested memory page is unencrypted. If the requested memory page has no corresponding page table entry in the page table of the virtual IOMMU, this may indicate that the memory page is encrypted. Responsive to determining that the memory page in unencrypted, the processing device may read the memory page and/or write to the memory page. Responsive to completing the operations described herein above with references to block 506, the method may terminate.

Figure 6:
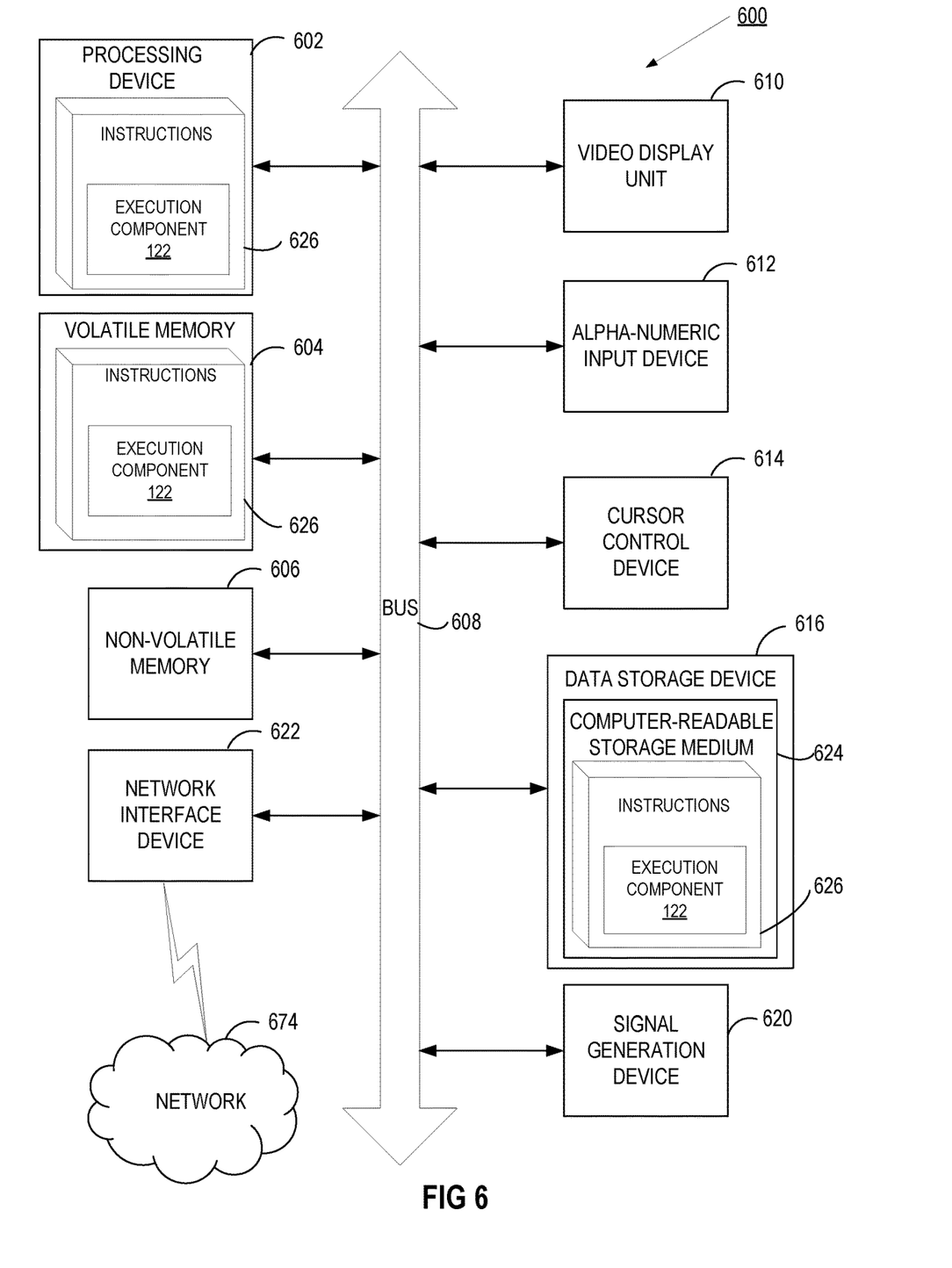
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500, execution component 122, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   creating, by a hypervisor running on a host computer system, a virtual device associated with a virtual machine managed by the hypervisor, wherein the virtual device comprises a virtual input/output memory management unit (IOMMU);
   performing at least one of notifying the virtual machine that the virtual device performs direct memory access (DMA) operations or assuming, by the virtual machine, that the virtual device performs DMA operations;
   appending, by a driver of the virtual machine, a plurality of page table entries to a page table of the virtual IOMMU, wherein each page table entry of the plurality of page table entries references unencrypted memory pages used by the virtual machine;
   responsive to receiving a memory access request with respect to a memory page, determining, by the hypervisor using the page table of the virtual IOMMU, whether the memory page is unencrypted by performing a lookup for a corresponding page table entry in the virtual IOMMU page table; and
   responsive to determining that the memory page is unencrypted by locating a reference to the corresponding page table entry in the page table, performing at least one of reading the memory page or writing to the memory page.

2. The method of claim 1, wherein creating the virtual device further comprises: causing the virtual machine to load the driver.

3. The method of claim 1, further comprising: responsive to failing to locate a reference to the memory page in the page table of the virtual IOMMU, determining that the memory page is encrypted.

4. A system, comprising:
   a memory;
   a processor operatively coupled to the memory, the processor configured to:
   create a virtual device associated with a virtual machine managed by a hypervisor, wherein the virtual device comprises a virtual input/output memory management unit (IOMMU);
   perform at least one of notifying the virtual machine that the virtual device performs direct memory access (DMA) operations or assume, by the virtual machine, that the virtual device performs DMA operations;
   append a plurality of page table entries to a page table of the virtual IOMMU, wherein each page table entry of the plurality of page table entries references unencrypted memory pages used by the virtual machine; and
   responsive to receiving a memory access request with respect to a memory page, determine, using the page table of the virtual IOMMU, whether the memory page is unencrypted by performing a lookup for a corresponding page table entry in the virtual IOMMU page table; and
   responsive to determining that the memory page is unencrypted by locating a reference to the corresponding page table entry in the page table, perform at least one of reading the memory page or writing to the memory page.

5. The system of claim 4, wherein the processor is configured to:
   cause the virtual machine to load a driver configured to append the plurality of page table entries to the page table of the virtual IOMMU.

6. The system of claim 4, wherein the processor is configured to:
   responsive to failing to locate a reference to the memory page in the page table of the virtual IOMMU, determine that the memory page is encrypted.

7. A non-transitory machine-readable storage medium storing instructions that cause a processor to:
   create a virtual device associated with a virtual machine managed by a hypervisor, wherein the virtual device comprises a virtual input/output memory management unit (IOMMU);
   perform at least one of notifying the virtual machine that the virtual device performs direct memory access (DMA) operations or assume, by the virtual machine, that the virtual device performs DMA operations;
   append a plurality of page table entries to a page table of the virtual IOMMU, wherein each page table entry of the plurality of page table entries references unencrypted memory pages used by the virtual machine; and
   responsive to receiving a memory access request with respect to a memory page, determine, using the page table of the virtual IOMMU, whether the memory page is unencrypted by performing a lookup for a corresponding page table entry in the virtual IOMMU page table; and responsive to determining that the memory page is unencrypted by locating a reference to the corresponding page table entry in the page table, performing at least one of reading the memory page or writing to the memory page.

8. The non-transitory machine-readable storage medium of claim 7, wherein the processor is configured to:
cause the virtual machine to load a driver configured to append the plurality of page table entries to the page table of the virtual IOMMU.

9. The non-transitory machine-readable storage medium of claim 7, wherein the processor is configured to:
responsive to failing to locate a reference to the memory page in the page table of the virtual IOMMU, determine that the memory page is encrypted.

* * * * *